United States Patent
Ju

(10) Patent No.: US 9,590,443 B2
(45) Date of Patent: Mar. 7, 2017

(54) POWER SUPPLY DEVICE USING SECONDARY BATTERY AND METHOD OF SWITCHING THE BATTERY MODE

(71) Applicant: Jingwan Ju, Seoul (KR)

(72) Inventor: Jingwan Ju, Seoul (KR)

( * ) Notice: Subject to any disclaimer, the term of this patent is extended or adjusted under 35 U.S.C. 154(b) by 251 days.

(21) Appl. No.: 14/370,772

(22) PCT Filed: Jan. 11, 2013

(86) PCT No.: PCT/KR2013/000259
§ 371 (c)(1),
(2) Date: Jul. 5, 2014

(87) PCT Pub. No.: WO2013/105823
PCT Pub. Date: Jul. 18, 2013

(65) Prior Publication Data
US 2015/0002073 A1   Jan. 1, 2015

(30) Foreign Application Priority Data

Jan. 12, 2012  (KR) .................. 10-2012-0003742
Dec. 4, 2012   (KR) .................. 10-2012-0139310

(51) Int. Cl.
*H02J 7/00*   (2006.01)
*H02J 7/14*   (2006.01)
(Continued)

(52) U.S. Cl.
CPC ............ *H02J 7/022* (2013.01); *H02J 7/0065* (2013.01); *H02J 7/007* (2013.01); *H02J 7/0013* (2013.01);
(Continued)

(58) Field of Classification Search
USPC ....... 320/103, 107, 101, 104, 109, 115, 162, 320/114, 116, 134, 136, 137; 307/82, 9.1,
(Continued)

(56) References Cited

U.S. PATENT DOCUMENTS 6,479,970 B2 * 11/2002 Reddy .................... H02J 9/062
307/66
6,664,762 B2 * 12/2003 Kutkut .............. H02M 3/33561
320/116

(Continued)

*Primary Examiner* — Alexis A Boateng
(74) *Attorney, Agent, or Firm* — GWiPS

(57) ABSTRACT

The present invention employs more than two secondary batteries; most output of one battery is supplied to load, and rest output is used to charge another battery for improving the battery efficiency and prolong the battery usable time (discharge time). The object of the present invention is to provide a power supplying device and battery mode switching method by using the secondary battery cells. According to the present invention of using more than two secondary batteries that; if either one of the secondary battery sets for discharging mode, the device including that; an inverter for delivering a DC output voltage of the secondary battery, which is in discharging mode, when one of the more than two secondary batteries is discharged; a relay performing the switching operation for connecting to other different secondary battery of more than two secondary batteries to the inverter, at other point, the secondary battery in discharge mode of more than two secondary battery is connected to the inverter; and a controlling unit for alternately supping the power of the more than two or secondary batteries to the load by controlling the switching operation of the relay via the inverter, a switching unit alters charging or discharging mode, the anode (+) and cathode (−) of each DC terminal, which is mutually and fixedly connected, and each moveable terminal of the secondary battery is switched to control the battery mode.

3 Claims, 13 Drawing Sheets

(51) Int. Cl.
*H02J 7/02* (2016.01)
*H02J 7/35* (2006.01)

(52) U.S. Cl.
CPC ........... *H02J 7/0047* (2013.01); *H02J 7/0054* (2013.01); *H02J 7/0055* (2013.01); *H02J 7/35* (2013.01); *H02J 2007/0067* (2013.01)

(58) Field of Classification Search
USPC ........................................................ 307/10.1
See application file for complete search history.

(56) References Cited

U.S. PATENT DOCUMENTS

| | | | | |
|---|---|---|---|---|
| 8,237,414 B1* | 8/2012 | Li | .......................... | H02J 7/0003 320/103 |
| 8,565,953 B2* | 10/2013 | Kato | ...................... | B60K 6/445 307/104 |
| 8,571,733 B2* | 10/2013 | Yamamoto | ............. | B60K 6/445 307/104 |
| 8,648,565 B2* | 2/2014 | Mitsutani | ............... | B60K 6/445 320/103 |
| 2005/0077866 A1* | 4/2005 | Killian | .................. | H02J 7/0024 320/103 |
| 2008/0143292 A1* | 6/2008 | Ward | ...................... | B60L 8/003 320/101 |
| 2009/0096399 A1* | 4/2009 | Chen | .................... | H01M 10/44 318/441 |
| 2011/0101909 A1* | 5/2011 | Bowman | ............... | H02J 7/0054 320/103 |
| 2011/0133555 A1* | 6/2011 | Choi | ...................... | H02J 3/383 307/65 |

* cited by examiner

POWER SUPPLY DEVICE USING SECONDARY BATTERY AND METHOD OF SWITCHING THE BATTERY MODE

BACKGROUND OF THE INVENTION

1. Field of the Invention

The present invention relates to a power supply device utilizing the secondary battery and method of switching the battery mode. Particularly, more than two secondary batteries are employed; one secondary battery is used for supplying the output power to the load, while other secondary battery is used to charge at least one battery at the same time, so that it is possible to improve the energy efficiency.

2. Related Prior Art

Unlike the primary battery, which is disposed after used-up once, generally the secondary battery is rechargeable through the reversible reaction, when it will be discharged.

However, such a secondary battery should be charged again by charging capacity of the battery after a certain time has elapsed, when it is discharged. While the secondary battery is charging, it is impossible to discharging or the efficiency of charging-discharging is significantly diminished. In most cases, more than two secondary batteries are provided for connecting in parallel. Or while the secondary battery is charging by using a separate unit, the other secondary battery is continuously discharging to use.

Furthermore, in case of this secondary battery is continuously used to discharge the normal rated current, it is a common problem that the actual using time of this secondary battery is markedly shortened than the ideal using time set by manufacturer.

As an example, a secondary lead battery converts the chemical energy to the electric energy, which means discharge, and converts the electrical energy to the chemical energy, which means charge, through energy converting cycle function of the battery.

Typically, when the secondary lead battery is in the discharging cycle, the electrode plate reacts with the sulfate (SO4) to produce the water for lowering the specific weight, and combine the sulfate returning to the electrolyte at the charging cycle be heavier specific weight.

That is, the secondary lead battery is composed the electrodes of the lead (Pb) and lead dioxide ($PbO_2$) dipped in the concentrated sulfuric acid solution.

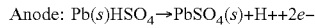

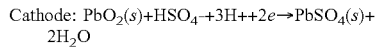

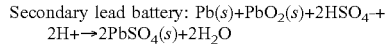

the cell reaction takes place as shown above.

The reaction is generated the insoluble $PbSO_4$ and it is deposited on the two electrodes. When the secondary lead battery is discharged, the sulfate is consumed and generated the water. Because the density of the generated water is approximately 70% of the sulfuric acid solution, it is possible to know the charging state of the battery by measuring the density of electrolyte. When the secondary lead battery is charged, the charging reaction of the electrode is reverse as mentioned above.

However, the sulfate deposited on the two electrodes over the long term of the charging/discharging cycles (including self-discharging) won't fall off and stay stuck on there during the charging cycle. This phenomenon is called the sulfate (sulfated).

Such a sulfated phenomenon grows bigger as the secondary lead battery discharge more. This sulfate causes to block the channel of the electrode reaction and act as an insulating function, so that the secondary lead battery are more than slows, Due to the blocking of the chemical and electrical reaction, the voltage, capacity and specific weight of the secondary lead battery is degraded.

Thus, there is a problem that due to the declined efficiency of the secondary lead battery, the battery usable time as fully charged state (discharging time) will be significantly shortened.

In fact, the ordinary (Delco) battery widely used for the automobile, the capacity of a lead battery is 12V, 100 A, which has the power of 1200 W. If the two lead batteries connected in parallel, the total power will be 2400 W. When the two batteries connected in parallel to supply the load 300 W, it will be theoretically used eight hours, but in practice it can be continuous discharged to use only about 1.5 hours. It will be verified in the following <Table 1>.

The <Table 1> shows a configuration of the two lead batteries having output of DC12V, 100 A, which are connected in parallel to load an incandescent lamp of 300 W through 1200 W inverter (model SI-1000A) for continuously discharging. The test result of the inverter voltage and the lead battery voltage were checked for 10 minutes interval.

TABLE 1

| Time (Minute) | Battery Output (V) | Load Current (A) | Inverter output Voltage (V) | Inverter Current (A) | Consumed Power (KW) | Note |
|---|---|---|---|---|---|---|
| 0 | 13.22 | 29.8 | 220 | 1.6 | | Start |
| 10 | 12.29 | 29.8 | 220 | 1.6 | | |
| 20 | 12.17 | 29.7 | 218 | 1.58 | | |
| 30 | 12.02 | 29.6 | 216 | 1.57 | | |
| 40 | 11.83 | 29.5 | 214 | 1.55 | | |
| 50 | 11.61 | 29.3 | 214 | 1.53 | | |
| 60 | 11.45 | 29.1 | 210 | 1.52 | | |
| 70 | 11.28 | 28.8 | 206 | 1.49 | | |
| 80 | 10.92 | 28.1 | 200 | 1.45 | | |
| 90 | 10.63 | 27.4 | 190 | 1.43 | 0.49 | End |

As shown in the <Table 1>, when a light of 300 W in the old stall is turned on continuously, such a continuous discharging and depending on the time elapse, the battery output voltage is rapidly dropped. After 1.5 hours (90 minutes) has discharged, the battery output voltage will be 10.64V or less and cannot be discharged no longer due to the weak voltage.

As described above, such a phenomenon is occurred due to the continuous discharging without intermediate charging. As the electrode surface of anode (+) and cathode (−) is coated with the lead sulfate, the reaction rate is diminished and the efficiency of the battery is decreased. Therefore, the only small fraction (0.49 kWh) of the original battery capacity (2.4 kWh) is available.

On the other hand, the number of charging/discharging cycles of the secondary battery has limited. As an example, the lead battery has limitation of 300 cycles. When a battery is charging and discharging approximately once a day, it will have one year life time.

The usable capacity, which is charged through the charging/discharging cycle is diminished over the repetition of charging and discharging cycles. As an example of two Delco 12V 100 A batteries, it can be used 1.5 hours for the first time. It will be 16.6% of the theoretical maximum capacity. But, the third time of charging/discharging cycle, it can be used 1.2 hours (1 hour 12 minutes) and it is available 15% of its original capacity, when it is charged again for sixth time cycle, it can be used only one hour seven minutes, it will be available about 13.9%. Because the percentage of the usable capacity is continuously diminished over the repeated charging/discharging cycles, the usable capacity is nothing after the 300 times cycles.

Additionally, when the lead battery is overload, it causes risk of blow up or damages the equipment. Because the risk of secondary lead battery, it is absolutely prohibited to be loaded by the regulation while it is charging. Usually, the lead battery can be continuously used only about 1.5 hours. Furthermore, it will take about 10 hours to fully charge. So, it is necessary to prepare the extra secondary lead batteries to continuously discharge for a night at the night stall. Also, the secondary lead battery must be fully charged a day before using them. Therefore, it is very inconvenient and uneconomical to prepare the many lead batteries for continuously discharging.

On the other hand, in order to improve the aforementioned problem, more than two batteries are employed for alternately discharging the battery, and supplying the partial discharging power to another battery for using as the charge voltage. This technology has disclosed on the Republic of Korea Patent Application Publication No. 2006-111499.

That is, the conventional technology provides to manage the usage of battery power, the management system and its method. The first battery supplies the power to the second battery for recharging, and supplying to the external load. At the specific time, the switching system and switching method could be switched the duties of the first battery and the second battery. That is, at a specific time, the second battery also provides the power for charging the first battery, while it begins to supply the partial power to the external load. Accordingly, the switching system and the switching method are able to switch the tasks of the first battery and the second battery without interrupting the electric power transmitting to the external load.

As shown in FIG. 1, the first example of the conventional technology shows that the first battery (1) is switched on the exchanging plates (25, 33) and the second battery (2) is switched on the second exchanging plates (26, 34) by setting the charging mode and discharging mode, respectively, through the alternating inverter (45) to supply the power to the load.

Referring to FIG. 1, the first example of the switching system will be described in more detail. The mechanical alternative switch (65) of the generator (100) includes the two batteries (1, 2) as shown in FIG. 1. The electrical generator (100) is used to provide the common domestic light of 2000 to 6000 watts to be extended time in the example uses or capable to provide the other independent environment.

As seen in FIG. 1, the first battery (1) is coupled to an exchanger switch (65) as a power source for providing a direct current. The terminals of the first battery (1) are coupled to the plates (46, 49) onto the bottom plate of first exchanger (34). When the first upper exchanger plate (26) contacts with the lower exchanger plate (34), the direct current is fed to the plates (27, 28) and the inverter (45). The inverter (45) converts the direct current supplied from the battery (1) to the alternating current for supplying to the breaker (37) and the external load (not shown).

On the other hand, in the above example, the AC current is supplied to the converter box (36) from the inverter (45) to operate the gear motor (35). The gear motor (35) drives the upper exchanger plates (25, 26). The gear motor (35) is coupled to the two solenoids (53, 54) to move the plates in each direction. The two solenoids (53, 54) are coupled to the two mechanical switches (51, 52), which switch the moving direction of the two upper exchanger plates (25, 26). The mechanical exchanger switch (65) is activated by a timing sequence. In other words, when the upper exchanger plates (25, 26) move to the rightward by the gear motor (35), the plates activate the switch (51), which operates the upper exchanger plates (25, 26) to move in the opposite direction (left from FIG. 1). The upper exchanger plates (25, 26) are continued to move left until the plate activates the switch (52) to move right. The side sliding velocity of the upper exchanger plates (25, 26) controls the switching frequency from the power supplying mode to the recharging mode of the first battery (1).

When the first upper exchanger plate (26) is moved to leftward as seen in FIG. 1, a direct current is supplied to the plates (27, 28) through the first lower exchanger plate (34) onto the plates (47, 48) from the second battery (2). When the first upper exchanger plate (26) is located on the left, the second battery (2) is supplying the power to the first battery (1), which is in the recharge mode.

That is, as seen in the example of the conventional technology, the management system and method is provided to use the power efficiently, which is provided by the multi-battery. The exchanger switch is set between more than two batteries, so that the single battery is not rapidly consumed. So, one battery starts running out of the power, then, the exchanger switch converts the power source to supply the power from other battery. Another battery is able to supply the recharging current to the weakest battery. The exchanger switch converts the power supply between more than two batteries. The exchanger switch of the power supply system is eventually increasing the battery service life and improves battery efficiency.

However, over the conventional technology of FIG. 1, it is possible theoretically, but there is a fatal problem to use the actual product, for the following reasons. As a result, the domestic and foreign patent applications are all abandoned or withdrawn.

In FIG. 1, the anode (+) of the second battery is connected to the plate No. 8, at the same time, being connected to the plate No. 33, over the terminal No. 9 of the plate No. 13. Further, the cathode (−) of the second battery is connected to the plate No. 25, at the same time being connected to the terminal No. 30 of the plate No. 25. Further, the anode (+) terminal of the first battery is connected to the plate No. 7, and connected to the plate No. 34, at same time, the cathodes (−) terminal of the second battery is connected to the plate No. 33, over the terminal No. 33 of the plate No. 9, at the same time being connected to the plate No. 34.

Accordingly, as an example of the conversion from the second battery (2) to the first battery at the terminal No. 13, the anode (+) terminal of the second battery is contacted momentarily with the cathode (−) terminal of the first battery. Thus, at this point, a strong surge current with a spark is occurred. It causes exploding of the battery. Furthermore, no matter how good conversing point take place, this occurrence is inevitable under the switching operation with the strong current of about 100 A.

On the other hand, the second and third examples of the prior art as shown in FIG. 2 and FIG. 3a, the examples are silent about such a switching terminal and no specific descriptions.

Additionally, the third example of the prior art as seen in FIG. 3b, the flowchart shows the operation of the exchanger switch, and also voltage drop of the battery. The prior art is described the switching conversion, as previously pointed out. However, the prior art did not present any solution for the critical problem. The converter switching for the strong DC current is issued the eventually inherent problems.

SUMMARY OF THE INVENTION

In order to solve the aforementioned problems, the present invention is invented, that more than two secondary batteries are provided, and one secondary battery is used to supply the most of its power to the load, and rest of the power is used to charge another secondary battery. Thus, the object of the present invention is to provide the control apparatus and the control method to improve the battery efficiency and prolong the usable time (discharge time) of the fully charged secondary battery.

Another object of the present invention is to provide more than two secondary batteries, and most output of the secondary battery supplies to the load and the rest of the output are used to charge another secondary battery. Even while the secondary battery is charging, it is possible to using another secondary battery as a power source to the load device. Thus, the object of the present invention is to provide the control apparatus and the control method to prevent the overload for avoiding the damage or blasting the secondary battery. So, it is possible to use and store safely the secondary battery.

Means for Solution

In order to achieve the above mentioned objects, one aspect of the present invention is that the control apparatus of the power supply unit providing more than two chargeable/dischargeable secondary batteries. One of the secondary battery is set on the discharging mode for a certain time period, and delivering the DC output voltage to the load. At the other point, the secondary battery being in the discharging mode is stopped discharging and switched to another secondary battery for discharging mode by actuating the relay unit, which includes the control device of the power unit; the battery power input unit (210) for inputting the power of the secondary battery; the relay control signal processing unit (240) detects the voltage magnitude of the secondary battery inputting from the battery power input unit (210); and the relay control signal output unit (250) outputs the relay control signal from the relay control signal processing unit (240) for controlling the relay unit.

Preferably, the battery voltage display units (260, 270) are included for displaying each voltage of the secondary battery detected by the control signal processing unit (240).

Additionally, it is preferable to include the constant-voltage circuit (220) for converting the voltage of the secondary battery inputted from the battery power input unit (210) to the activating voltage of the relay.

Further, it is preferable to include the optional setting unit (290) for determining the mode conversing point of charging/discharging of the secondary battery.

In addition, it is preferable to determine the mode conversing point of charging/discharging the secondary battery, when the voltage of the secondary battery drops below a predetermined reference value.

Further, it is preferable to include the charging mode that a partial output of the secondary battery, which is in discharging mode, is used to charge other secondary battery, which is not in a discharging mode.

Moreover, it is preferable to adopt more than two secondary batteries, which are paired of the first battery (1) and second battery (2). When the first battery (1) is in the discharge mode, the second battery (2) is in the charge mode.

On the other hand, in order to achieve the aforementioned objects of the present invention, a secondary battery according to another aspect of the controlling method of the power supply apparatus using, (a) measuring step to measure the instantaneous voltage of the secondary battery (S1, S2); (b) comparing step to compare the measured instant voltage of the secondary battery (VB1, VB2) (S3); (c) selecting step to pick-up the highest voltage among the measured instant voltage of the secondary battery (VB1) to use the discharging mode; (d) checking step for deciding the discharging voltage of the secondary battery in the discharging mode drops below a predetermined reference value (S5); and (e) when the voltage drops below the predetermined reference value, the mode converting step (S8) is activated to stop discharging of the secondary battery in the discharging mode and switching to another secondary battery for charging mode.

Finally, it is preferable to completely stop the discharging mode, if the voltage of the secondary batteries below than the predetermined reference voltage.

A power supply device and switching battery mode employs more than two secondary batteries, a switching unit alters charging or discharging mode, the anode (+) and cathode (−) of each DC terminal is mutually and fixedly connected, and each moveable terminal of the secondary battery switched to control the battery mode; an inverter for delivering a DC output voltage of the secondary battery, which is in discharging mode, when one of the more than two secondary batteries is discharged; a relay performing the switching operation for connecting to other different secondary battery of more than two secondary batteries to the inverter, at other point, the secondary battery in discharge mode of more than two secondary battery is connected to the inverter; and a controlling unit for alternately supping the power of the more than two or secondary batteries to the load by controlling the switching operation of the relay via the inverter.

A battery charger for charging other different secondary battery by using a partial output of the secondary battery, which is in discharging mode.

a fourth switch (SW4) for connecting the secondary battery and other different secondary battery to a commercial AC for charging, or the secondary battery in charging mode is connected to external power source, such as a solar cell for directly charging. a first battery (1) and a second battery (2) form a pair for more than two secondary batteries. each DC terminal of anode (+) is mutually and fixedly connected, and cathode (−) is connected to switching means for performing the switching. a set of battery connection plate (15, 16) is connected to each polarity terminal of the secondary battery; a relay unit (11, 12) for connecting each of movable terminal to each of the battery connection plate (15, 16); a first fixed terminal (111, 121) of the relay is commonly connected to a charger connection plate (13); and a second fixed terminal (112,122) of the relay is commonly connected to an inverter connection plate (14).

a battery power input unit (210) for inputting a power of the secondary battery; a battery voltage display unit (260, 270) for outputting an voltage magnitude of the secondary battery inputted from the battery power input unit (210); a relay control signal output unit (250) for outputting a relay control signal to control the relay operation; and a processing unit (240) including a control IC for outputting a relay control signal via the relay control signal output unit (250) after detecting the voltage magnitude of the secondary battery.

A method of switching the battery mode, the switching method comprises the steps of:

(a) measuring an instant voltage of the secondary battery, and outputting each voltage via an voltage display unit (260, 270) (S1, S2); (b) comparing the measured instant voltage (VB1, VB2) of the secondary battery (S3); (c) designating the highest value of the measured instant voltage (VB1) of the secondary battery sets for discharge mode, and lowest value of the measured instant voltage (VB1) of the secondary battery sets for charging mode; (d) deciding whether the voltage of the secondary battery in discharging mode is dropped below a predetermined reference value (S5); and (e) if the voltage drop of the discharging battery is below than the predetermined reference value, switching the discharging mode of the secondary battery to charging mode, and a secondary battery, which was in charging mode to discharging mode (S8).

Effect of the Invention

According to the solving means of the above problems, more than two secondary batteries are employing that; most power of the discharging secondary battery supplies to load, and rest of the output is used to charge another secondary battery. Therefore, it is possible to improve the battery efficiency and prolong the usable time (discharge time) of the secondary battery. Thus, the suitable control device for power supplying and control method has developed by using the secondary battery cells.

Further, employing more than two secondary batteries, and supplying most output power of the secondary cells to the load, and rest of the output power is used to charge another secondary battery. Then, a suitable control apparatus and method is provided for the power supply unit by employing the secondary battery. While one secondary battery is charging, it is possible to charge or store the energy safely by using another secondary battery without fear of overloading, blasting or damaging the equipment.

DETAILED DESCRIPTION OF THE PREFERRED EMBODIMENTS

Hereinafter, the configuration and operation of the preferred embodiment of the present invention will be described in detail with reference to the accompanying drawings.

Figure 1:
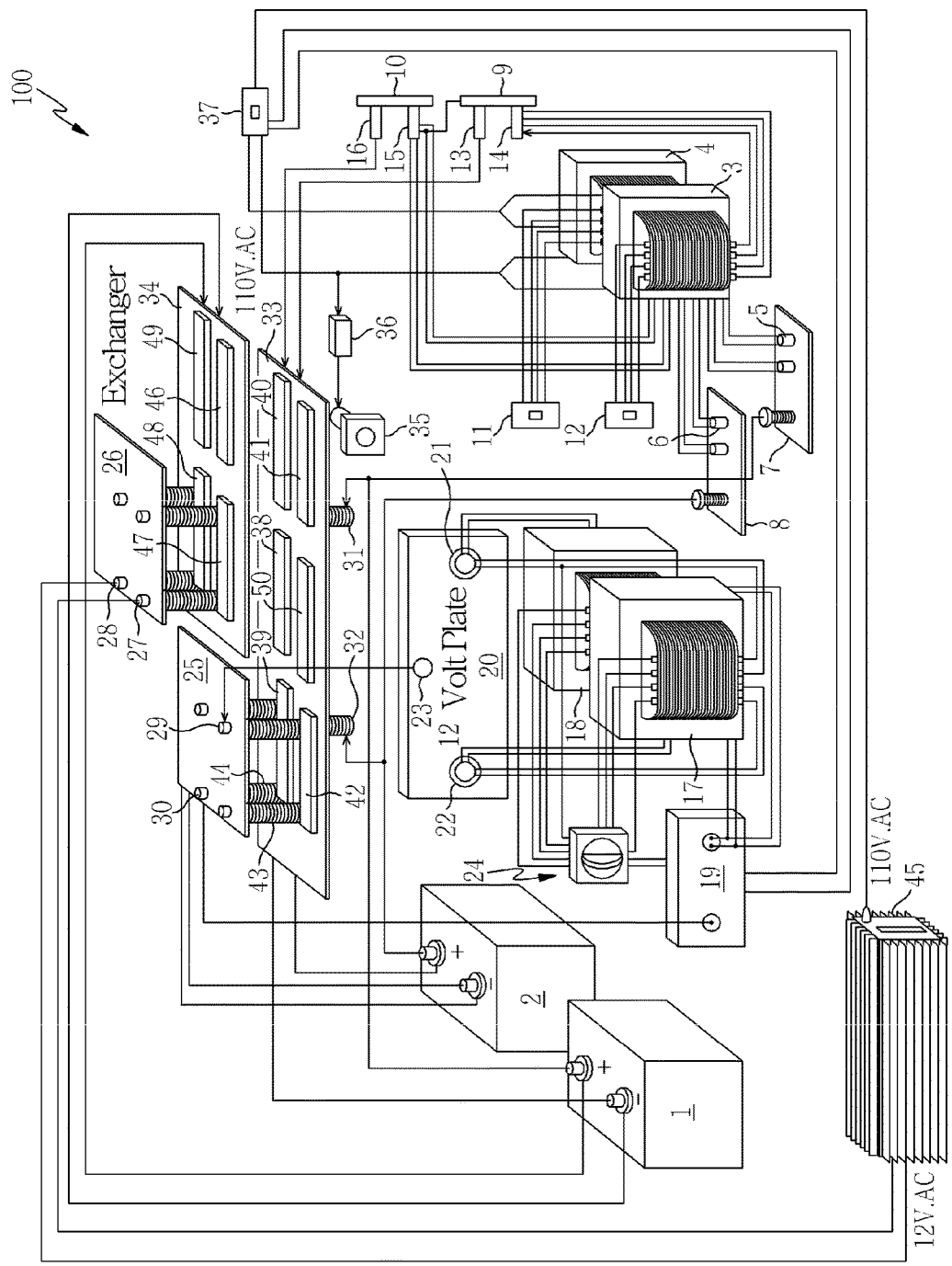
FIG. 1 shows a generator with exchanger switch and two batteries according to the first example of the conventional technology.
Figure 2:
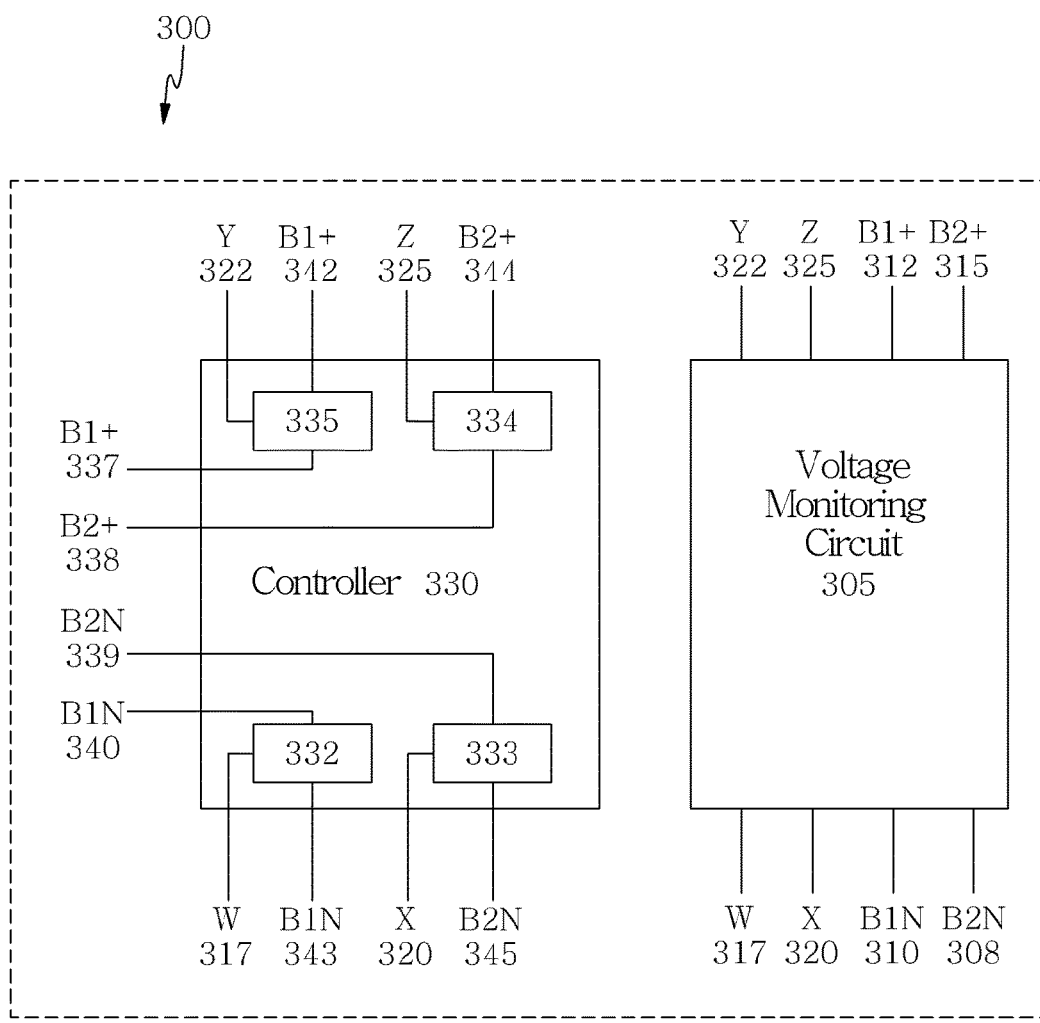
FIG. 2 is a schematic drawing showing an electronic exchanger switch according to the second example of the conventional technology.
Figure 3A:
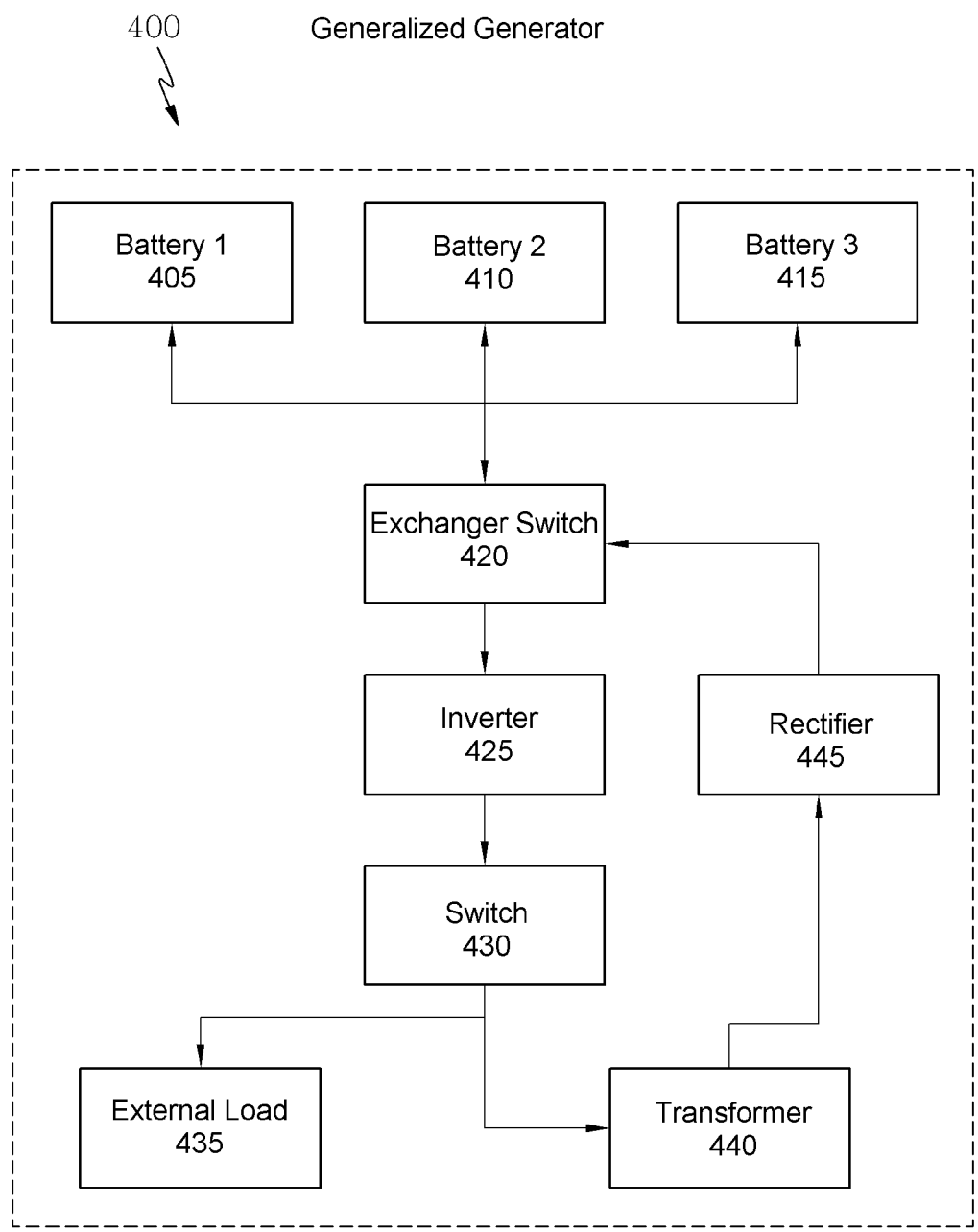
FIG. 3a is a schematic drawing showing a generator with exchanger switch and three batteries according to the third example of the conventional technology.
Figure 3B:
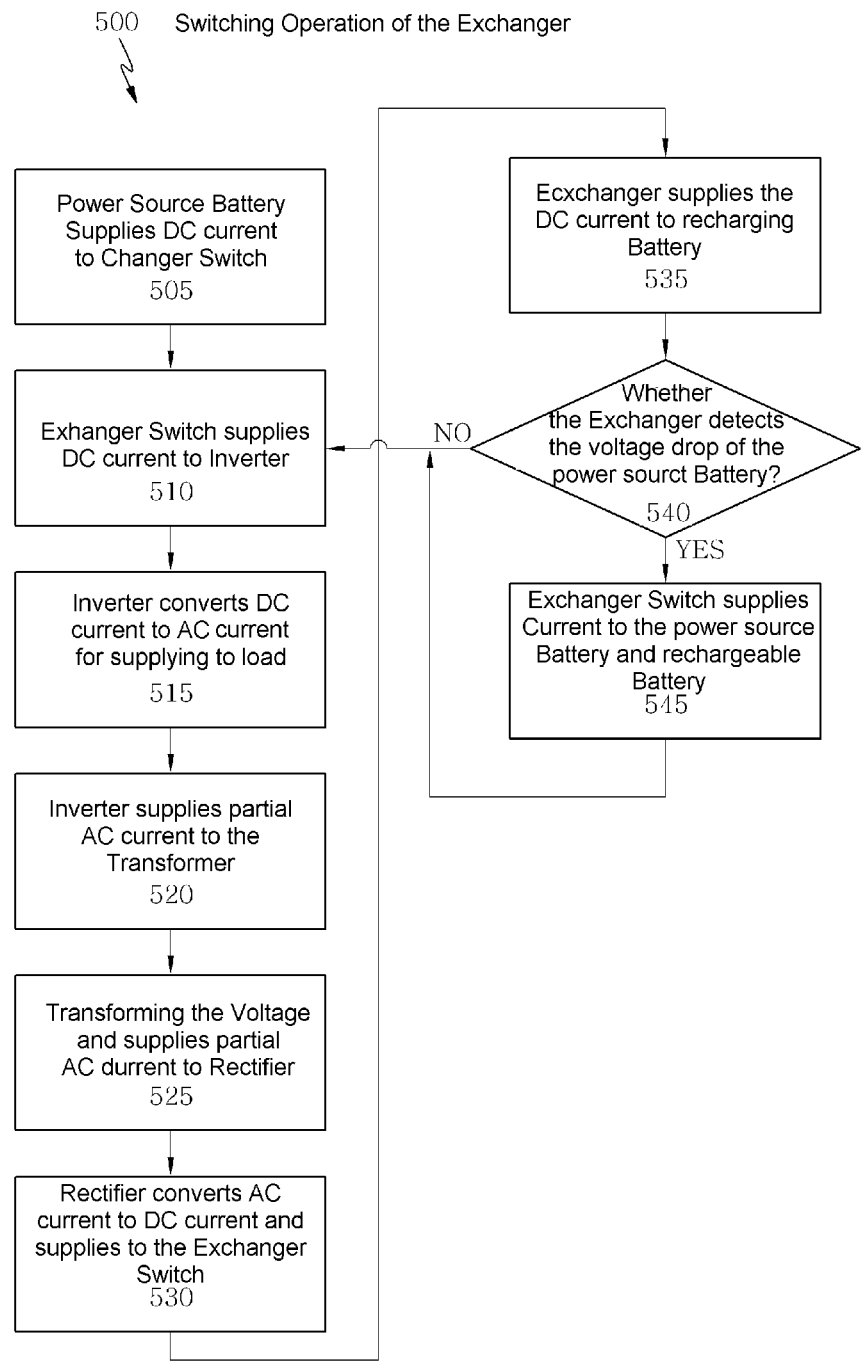
FIG. 3b is a flowchart showing an operating method of the exchanger switch according to the third example of the conventional technology.
Figure 4:
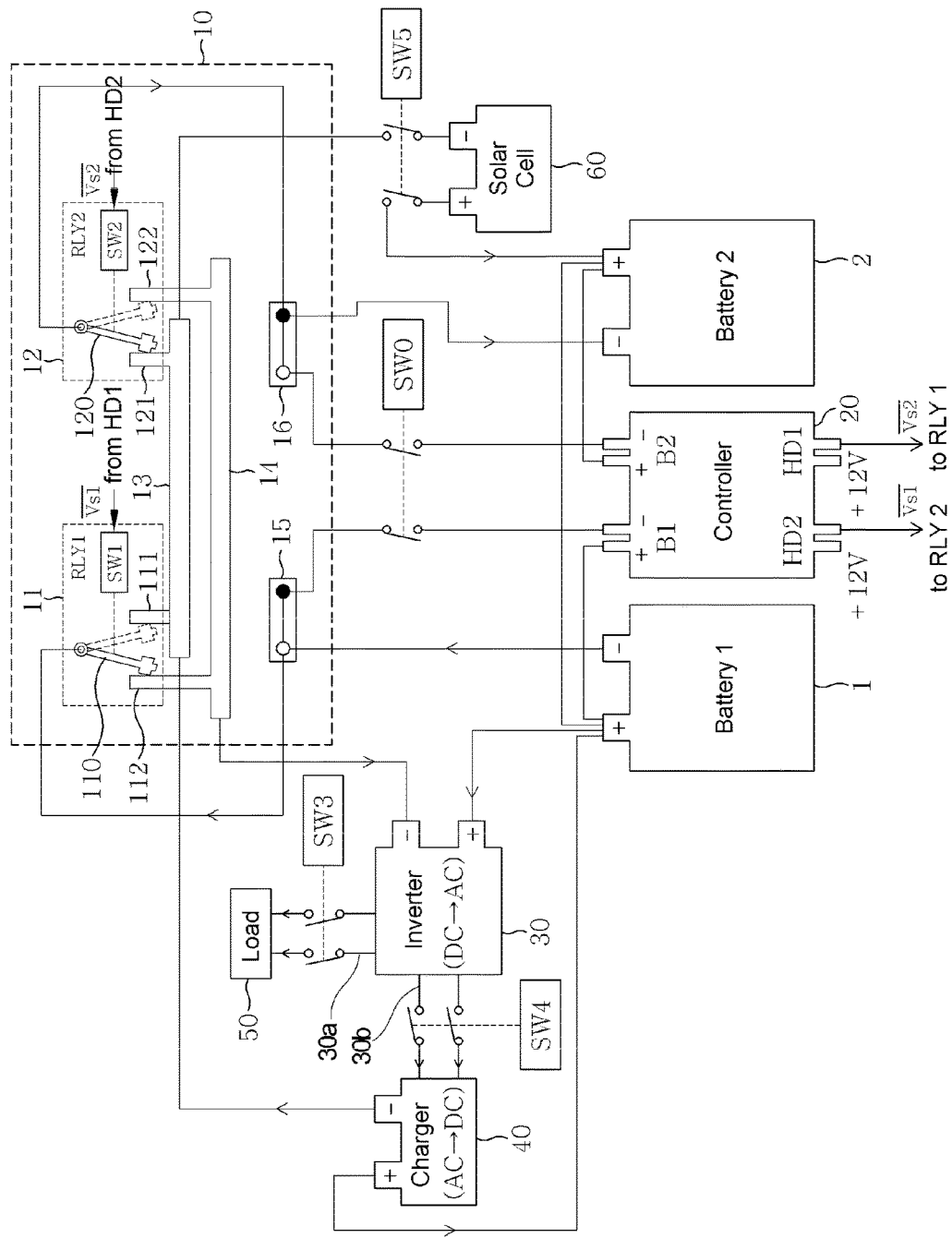
FIG. 4 is an overall configuration of the power supply apparatus according to the present invention.
Figure 5:
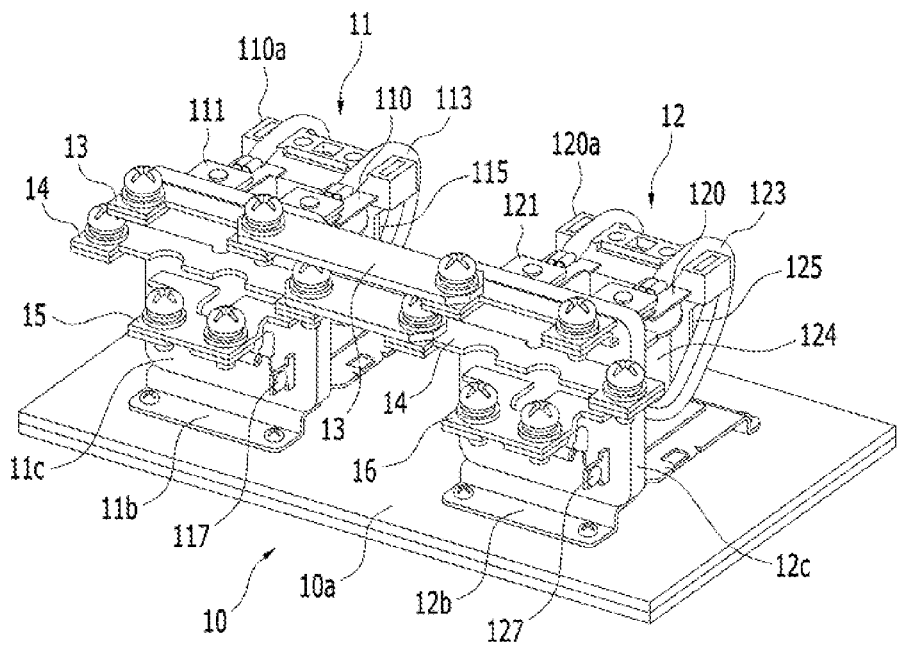
FIG. 5 is a perspective photograph showing the relay front view of the FIG. 1.
Figure 6:
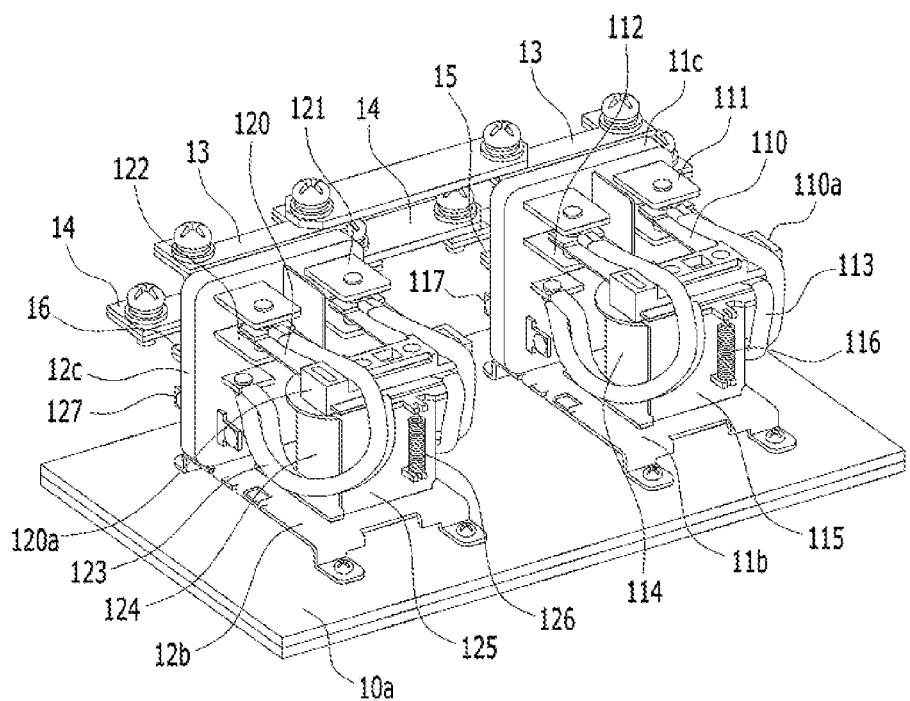
FIG. 6 is a perspective photograph showing the relay rear view of the FIG. 1
Figure 7:
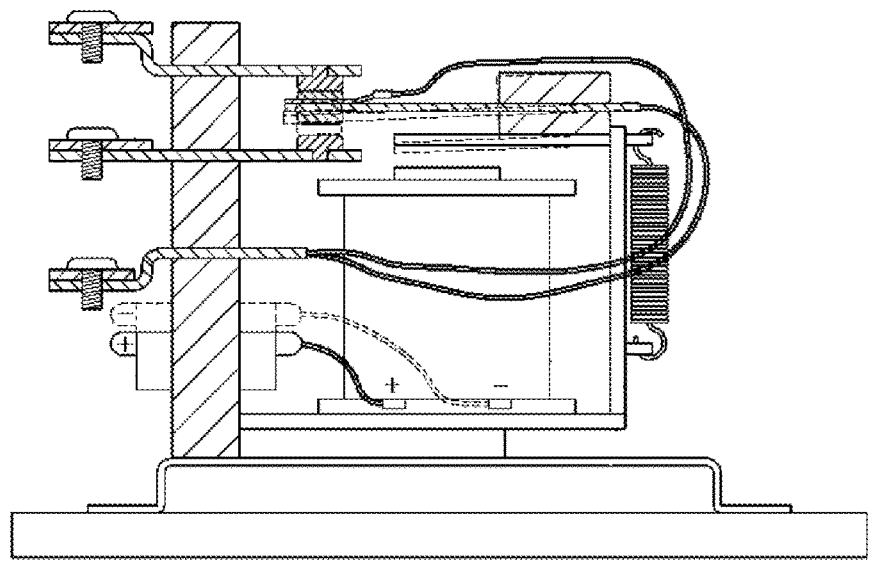
FIG. 7 is a photograph showing the relay lateral view of the FIG. 1.
Figure 8:
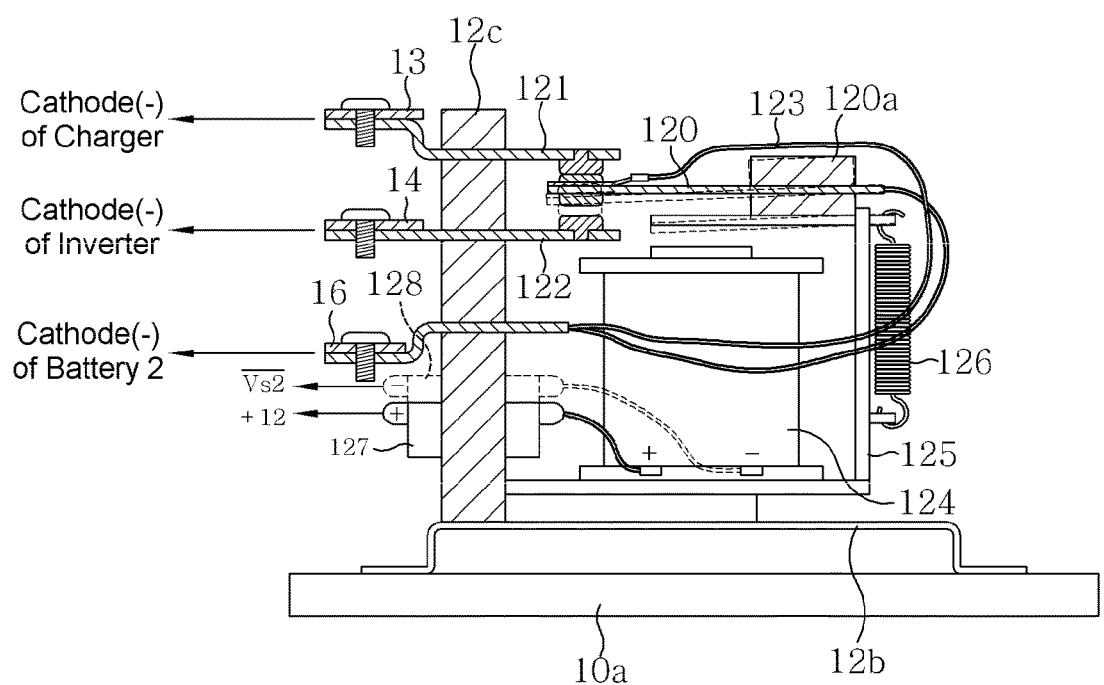
FIG. 8 is a partial cross-sectional view of the relay of the FIG. 1.
Figure 9A:
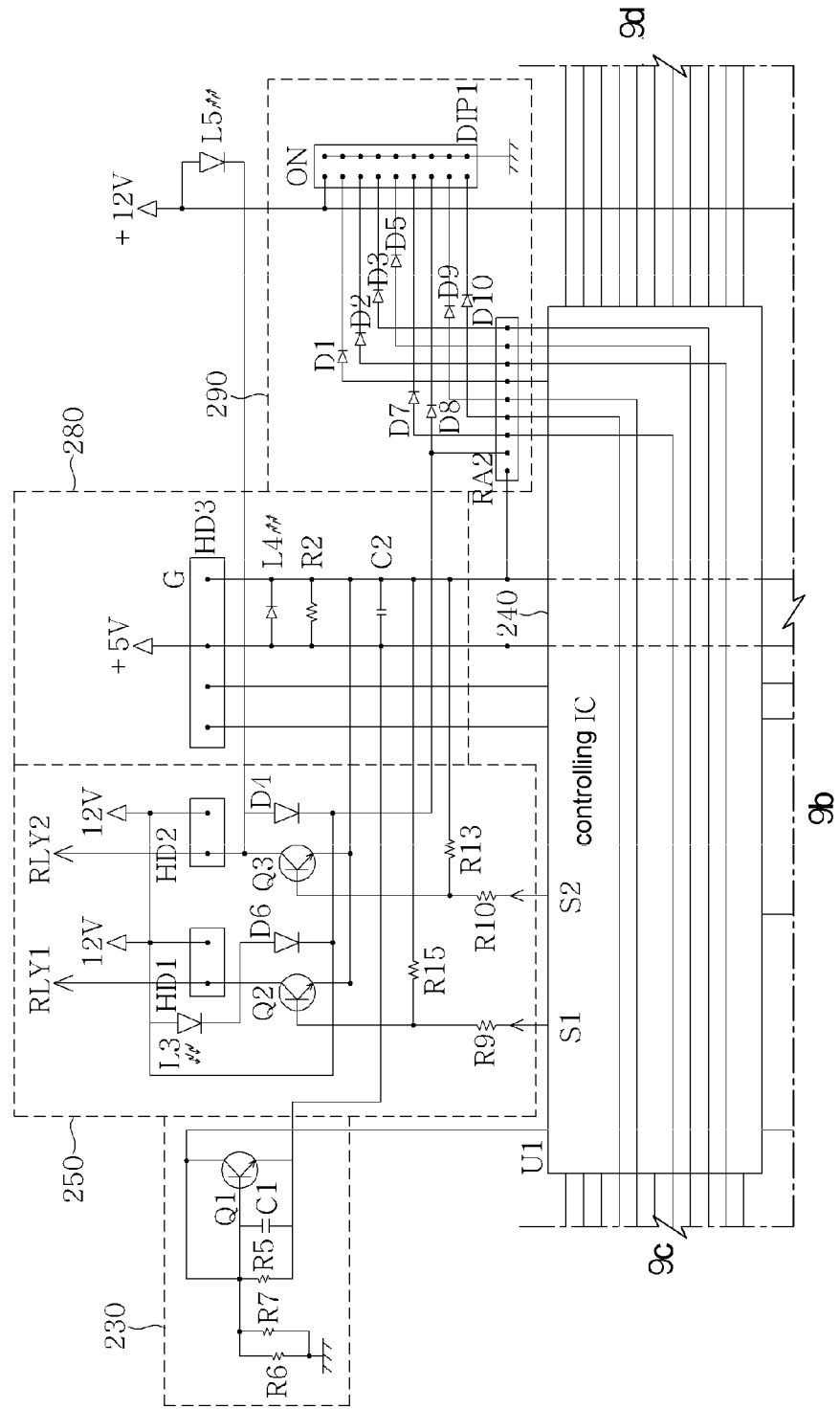
FIG. 9 is a controller circuit diagram of the FIG. 1.
Figure 9B:
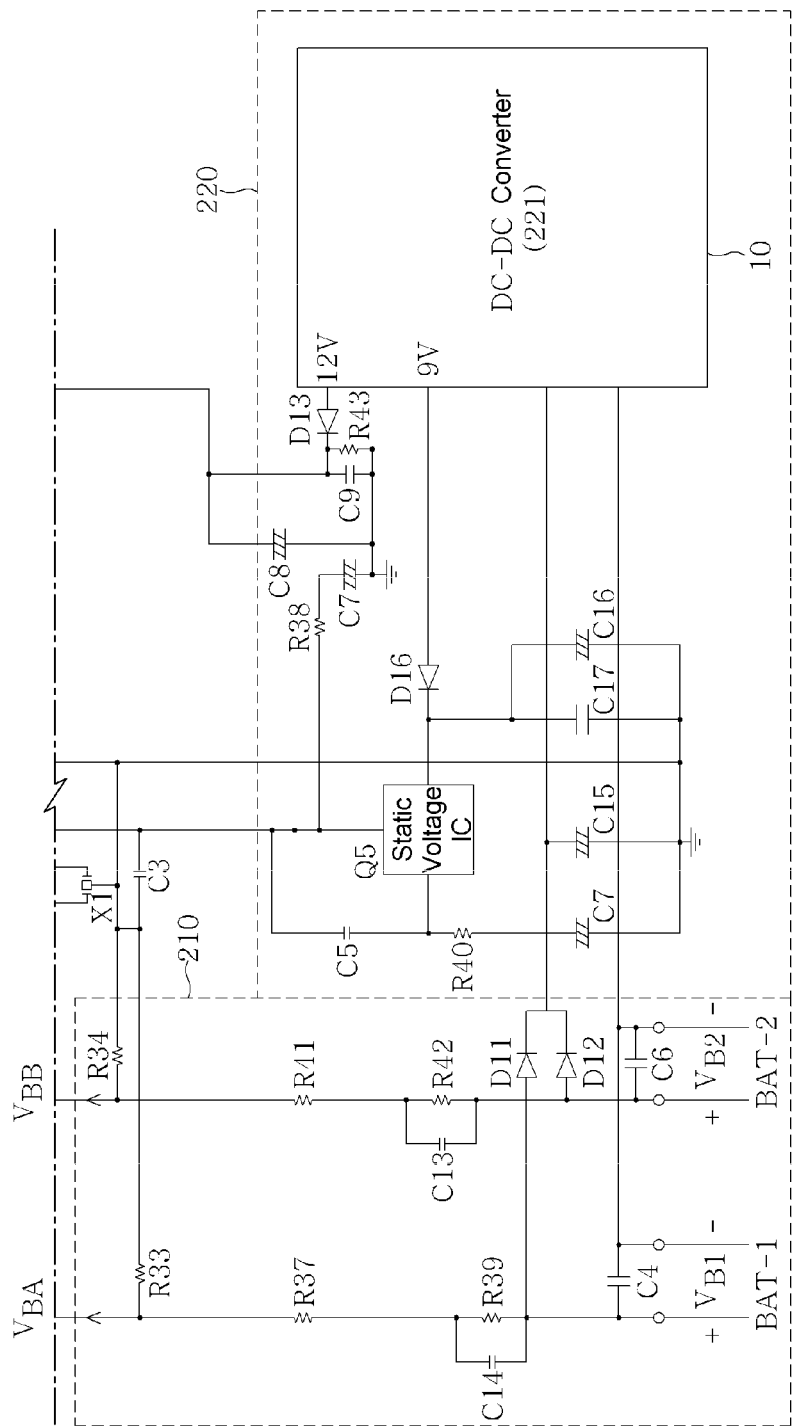
Figure 9C:
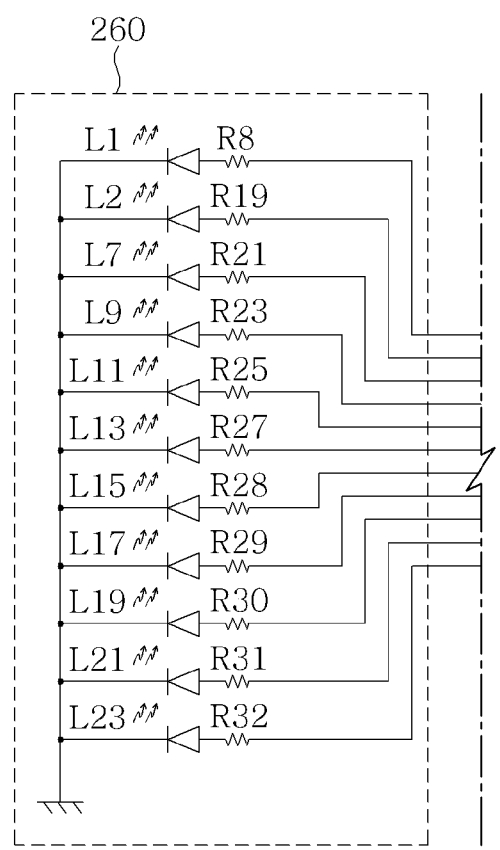
Figure 9D:
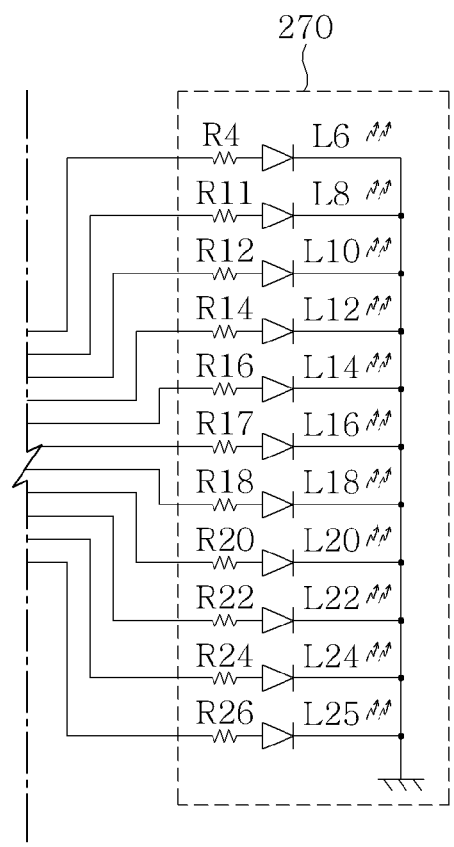
Figure 10:
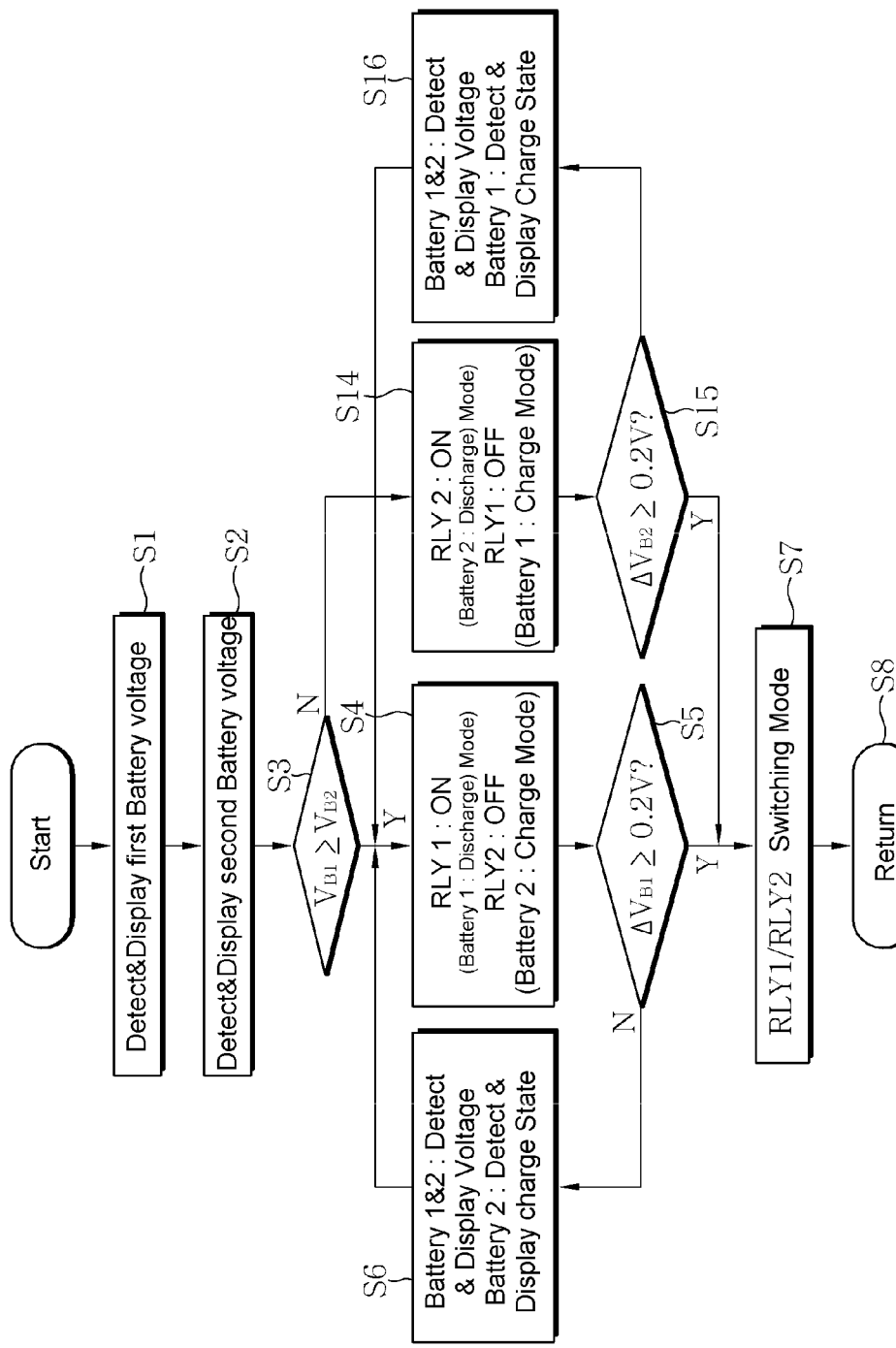
FIG. 10 is a flow chart showing the controller operation of the FIG. 9.
Figure 11A:
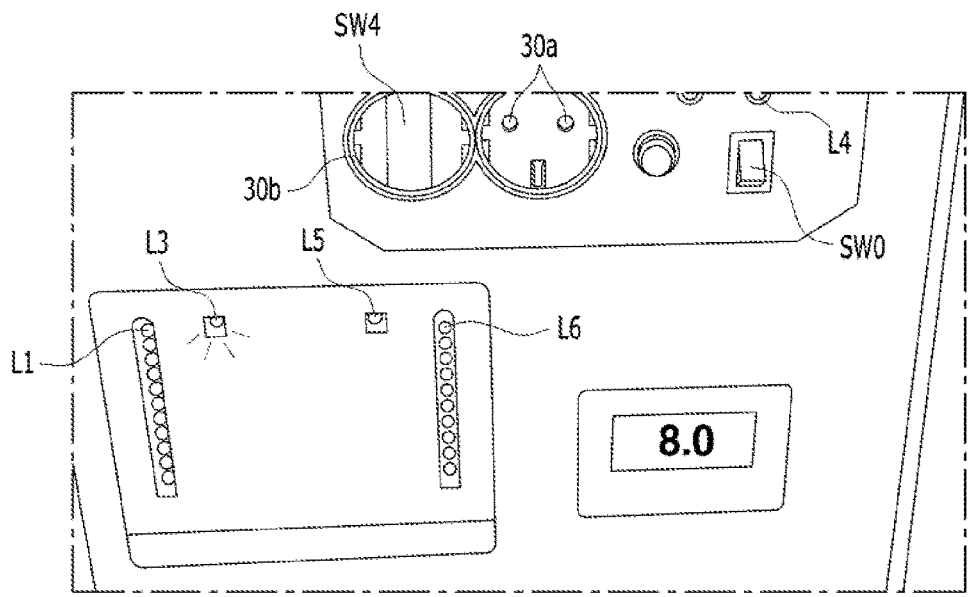
FIG. 11a is a photograph showing discharging state of the battery 1 as a power source device and displaying the actual charging status of the battery 2 of the present invention.
Figure 11B:
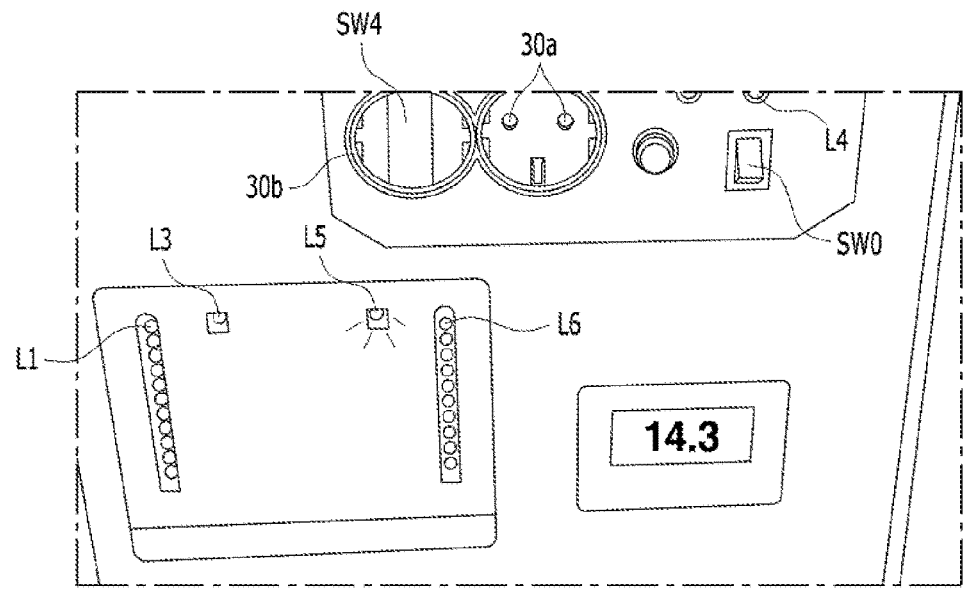
FIG. 11b is a photograph showing discharging state of the battery 2 as a power source device and displaying the actual charging voltage of the battery 1 according to the present invention.

FIG. 4 is an overall configuration of the power supply apparatus according to the present invention. FIG. 5 is a perspective photograph showing the relay front view of the FIG. 1. FIG. 6 is a perspective photograph showing the relay rear view of the FIG. 1. FIG. 7 is a photograph showing the relay lateral view of the FIG. 1. FIG. 8 is a partial cross-sectional view of the relay of the FIG. 1. FIG. 9 is a controller circuit diagram of the FIG. 1. FIG. 10 is a flow chart showing the controller operation of the FIG. 9. FIG. 11a is a photograph showing discharging state of the battery 1 as a power source device and displaying the actual charging status of the battery 2 of the present invention. FIG. 11 b is a photograph showing discharging state of the battery 2 as a power source device and displaying the actual charging voltage of the battery 1 according to the present invention.

As shown in FIG. 4, the power supply system of the present invention comprises the secondary battery as the first battery (1) and second battery (2); an inverter (30) for inverting the DC voltage of the battery in discharging mode to the AC for supplying power to the load (50); the battery charger (40) and the controlling unit (20) for rectifying the AC output of the inverter (30) or commercial AC of the power source to the DC for charging the battery; the relay unit (10) for connecting the first battery (1) or second battery (2) to the inverter or battery charger according to the control operation of the discharging mode or charging mode, respectively designated by the control unit (20).

In some cases, it is possible to further include that the commercial AC power source may be directly connected to the fourth switch (SW4) for charging the battery or the external solar cells (60) as the external power source is directly connected to the battery for charging.

It is preferably that the secondary battery consists of the paired first battery (1) and second battery (2). However, it is not necessarily limited to two batteries. More than three batteries could be used. The secondary battery as the first battery (1) and the second battery (2), each battery performs the function of discharging cycle, which converts the chemical energy to the electrical energy and charging cycle, which converts the electrical energy to the chemical energy. The secondary battery performs the cycle functions alternately and repeatedly, while one battery is discharging, other battery is charging, according to the controlling operation by the controlling unit (20).

The solar cell (60), which is using a property of the semiconductor, converts the sun light (photons) to the electrical energy for supplying the DC voltage to the battery by the switching operation of the controlling unit (20). Thus, it is possible to use auxiliary power to charge the first battery (1) and the second battery (2) or supply to the load (50). At this moment, it is not necessary to limit the solar cells as the auxiliary power. It could be used a wind power generator, hydraulic power generator, or other power generator as the auxiliary power supply.

The controlling unit (20) is automatically detecting the DC voltage output magnitude from more than two secondary batteries of the first battery (1) and second batteries (2) batteries. If the output magnitude of DC voltage is below than the reference voltage, the controlling unit automatically switches to other secondary battery for supplying the DC voltage from other secondary battery. At this point, the other battery of the secondary battery is detected the magnitude of output DC voltage. If the voltage is below than the reference voltage, then the controlling unit automatically switches to another secondary battery to output the DC voltage.

Further, the controlling unit (20) controls the inverter (30) to supply the most of AC power to the main load (50), and rest of AC power outputs to the charger (40) for charging the first battery (1) and second battery (2).

Also, the controlling unit (20) controls the charger (40) for using one of the secondary battery, which is in discharging, as a power source. It is possible to switch the AC power, which supplies to the charger (40) to other secondary battery for a power source for charging.

Further, the controlling unit (20) controls the charger (40) to charge the first battery (1) and a second battery (2) by supplying the commercial AC power as the power source. The structure and operational function for the controlling unit (20) will be described in detail later with reference to FIGS. 9 and 10.

First, the greatest feature of the present invention is that; excluding the various switches, each DC terminal of the anode (+) is connected to be interlocking, but the cathode (−) is switchable to control. Generally, the cathode (−) is connected to the ground, and anode (+) is connected to the switches for controlling operation. However, the present invention is in opposite to the common method, since the switching of the cathode (−) electrode minimizes surge current and spark during switching. Therefore, it is possible to protect the battery from the risk of explosion.

That is, the anode (+) terminal of the first battery (1), second batteries (2), inverter (30), charger (40) and of course, the controlling unit (20) is fixedly connected mutually.

On the other hand, the cathode (−) of the first battery (1) and second battery (2) is connected to the first battery connection terminal (15) and second battery connection terminal (16) of the relay unit (10), respectively. Further, it is connected to the movable contact (110) of the first relay (11) and the movable contact (120) of the second relay (12), respectively. Then, it is further connected to the cathode (−) of the connecting terminal (B1) of the first battery and the connection terminal (B2) of the second battery of the control unit (20). However, it is preferable that the first battery connection terminal (15) and the second battery connection terminal (16) of the relay unit (10) is connected to the first battery connection terminal (B1) and the connection terminal (B2) of the second battery of the controlling unit (20) through a power switch (SW0). Thus, the controlling unit is operated, when the power is turned on, Hereinafter, the operation of the relay unit (10) will now be described in detail with reference to FIG. 4 through FIG. 8. The relay unit (10) provides a first relay (11) and second relay (12) on the base (10a). Each relay contributes each relay plate (110b, 120b). Again, the front of each plate is vertically installed to fix the non-conductive support (110c, 120c).

The charger connection plate (13) and the inverter connection plate (14) are cross-fixed to install in the direction of horizontal. The charger connection plate (13) and the inverter connection plate (14) are electrically separated, each other. On the other hand, the charger connection plate (13) is electrically connected to the first fixed terminal (111) of the first relay (11) and the first fixed terminal (121) of the second relay (12). The inverter connection plate (14) is electrically connected to the second fixed terminal (112) of the first relay (11) and the second fixed terminal (122) of the second relay (12).

Accordingly, the first switch (SW1) is ON state ($Ws1$='LOW'), the movable terminal support plate (115) on the first plate (110b) is supported by a movable terminal (110) of the first relay. The second fixed terminal (112) and the inverter connecting plate (14) are connected according to the solenoid (114) operation. As the first battery (1) is connected to the inverter (30), the first battery is operated in discharge mode. (Referring to the solid line shown in FIG. 4)

At this point, the second switch (SW2) must be OFF state ($Vs2$='HIGH'). The movable terminal support plate (125) on the second plate (120b) is supported by the movable terminal (120) of the second relay. The finger spring (126) is supported the first fixed terminal (122) and the charger connection plate (13). Thus, the second battery (2) is connected to the charger (40), the battery will be in the charging mode. (Referring to the solid line shown in FIG. 4).

Thus, the inverter (30) outputs the AC to the first output receptacle (30a) and a second output receptacle (30b) inverting the DC power from the first battery to the AC through the internal circuit. Accordingly, the user can connect the plug (SW3) of the load (e.g. 300 W bulb) to the first outlet to lit the bulb.

Further, the second output receptacle (30b) of the inverter (30) is connected to the plug (SW4) of the charger (40), a portion of the AC output of the inverter (preferably 15~35%) is outputted to the charger. Thus, the charger supplies the DC being rectified and converted to the second battery (2), which is in charging mode for charging the second battery (2).

In this case, for the additional explanation, the cathode (−) of the charger is connected to the charger connection plate (13), through the first fixed terminal (121) of the second relay and the movable terminal (120) of the second relay, and through the second battery connection terminal (16), contacting to the cathode (−) of the second battery, so that the second battery is able to be operated in charging mode.

On the other hand, the fourth switch (SW4), which is the plug of the charger may be connected to the second outlet (30b) of the inverter, but can be connected to (not shown) the outlet of AC commercial power source (120V, 60 Hz) for AC power source of the compact fuel generator or hydro generators as the auxiliary generator. The auxiliary AC power source could be supplied for charging.

On the other hand, the first and second switches (SW1, SW2) of the relay contacts the first and second control signal output terminal (HD1, HD2) of the controlling unit (20). The switching is take place according to the first and second control signals (Vs1, Vs2). The anode (+) of each control signal output terminals (HD1, HD2) is fixedly contacted to the +12 V. Therefore, the conversion is performed by the first and second solenoids (114, 124) according to the control signal outputs through the cathode (−) of each control signal output.

That is, the first control signal (Vs1) is 'LOW', and the second control signal (Vs2) is 'HIGH'; then, the first solenoid (114) is "on" and the second solenoid (124) is "off" (the solid line in FIG. 4). The cathode (−) of the first battery (1) is connected to the load (50) through "first battery connection plate (15)—the movable terminal of the first relay (110)—a second fixed terminal of the first relay (112)—the inverter connection plate (14)—inverter (30)' (the inverter and the battery charger is coupled by inductive coupling, but electrically isolation). The cathode (−) of the second battery (2) is connected to the charger (40) through "the second battery connection plate (16)—the movable terminal of the second relay (120)—the first fixed terminal of the second relay (121)—the charger connection plate (13).' The first battery in the discharging mode and the second battery are in charging mode. Note that the arrow in FIG. 4 shows the direction of the energy transfer, not indicating the direction of the current.

Conversely, the first control signal (Vs1) is 'HIGH', and the second control signal (Vs2) is 'LOW', then, the first solenoid (114) is "off" and the second solenoid (124) is on (the dotted lines shown in FIG. 4). The cathode (−) of the first battery (1) is connected to the charger (40) through the "first battery connection plate (15)—the movable terminal of the first relay (110)—the first fixed terminal of the first relay (111)—the charger connection plate (13).' The cathode (−) of the second battery (2) is connected to the load (50) through "the second battery connection plate (16)—the movable terminal of the second relay (120)—a second fixed terminal of the second relay (122)—the inverter connection plate (14)—inverter (30).' Therefore, the first battery is in the charging mode and the second battery is in the discharge mode.

Unexplained reference numeral (113, 123) is the wires for connecting the first and second battery connection terminal (15, 16) to the movable terminal of each relay (110, 120). The two terminals have provided the same shape of left and right for a certain connection. Each terminal has connected with two wires, which is the total of four wires. Each battery connection terminal (15, 16) is connected to each movable terminal of the corresponding relay. Unexplained reference numeral (110a, 120a) of the movable contact of each relay (110, 120) is a fixing portion. Unexplained reference numeral 127 is a control signal terminal of the second relay.

Now, the configuration and operation of the controlling unit (20) will be described with reference to FIG. 9 and FIG. 10 of the present invention.

As shown in FIG. 9, the controlling unit (20) includes the battery power input unit (210) for inputting power from the first and second battery; a constant-voltage circuit (220) for converting the battery voltage of +12 V, or +24V, inputs from the battery power input unit (210) to the constant voltage of +5 V and +12 V, respectively; the first battery voltage display unit (260) and a second battery voltage display unit (270) for displaying the magnitude of the first and second battery voltage inputted from the battery power input unit (210); the relay control signal output unit (250) for outputting the relay control signal to control the relay operation, and for detecting the voltage magnitude of the first and second battery; and a processing unit (240) including the control IC for outputs the relay control signal through the relay control signal output unit (250).

Additionally, the controlling unit may further include the optional setting unit (290) through this, it is possible to arbitrarily switch the charging/discharging mode of the first and second batteries.

An unexplained reference numeral (230) is the reset unit of the control IC and it is the extra input-output terminal (280) available as additional terminal.

First, the battery power input unit (210) is described that; the DC voltage (VB1) of the first battery (1) is detecting through the voltage-dividing resistors (R37, R33); inputting via the VBA terminal of the control IC (Q1); the DC voltage (VB2) of the second battery (2) is detected through the voltage-dividing resistors (R41, R34); inputting through the terminal VBB of the control IC (Q1). For reference, C14 and C13 are for the noise filtering capacities.

On the other hand, the voltage of the first and second battery inputted from the battery power input unit (210), and mixed by the diode (D11, D12) for inputting to a DC-DC converter (221) of the constant-voltage circuit (220); the DC-DC converter (221) outputs constant voltage (+12V) for driving the relay and constant-voltage (+9 V) for control circuit. Further, the DC-DC converter (221) outputs the constant-voltage (+9V) for the control circuit. Then, the constant-voltage of (+9V) is adjusted again to the constant voltage of +5 V at the constant voltage IC (Q5).

Now, the control IC (Q1) of the processing unit (240) outputs the instantaneous voltage magnitude of the first battery through the LEDs (L1~L23) of the first battery voltage display unit (260), and the instantaneous voltage magnitude of the second battery through the LEDs (L6~L25) of the second battery voltage display unit (270). For an example, the control IC (U1) could be used as a PIC16F877A.

Further, the instantaneous voltage magnitude of the first and second battery compares for controlling the relay unit (10) "on/off" through the relay control signal output unit (250).

For example, when a 'high' signal is outputted via the control signal output terminal (S1) of the first relay, the switching transistor (Q2) is turned on. Accordingly, a control terminal signal (Vs1) of the first relay control signal output terminal (HD1) is set 'LOW'. Therefore, a +12 V voltage is outputted to the solenoid (SW1 in FIG. 4) (114 in FIG. 6) of the first relay (11) through the upper power supply terminal of the first relay control signal output terminal (HD1). Finally, the first solenoid (114) is activated, the first relay movable terminal (110) is connected to the second fixed terminal (112). The cathode (−) terminal of the first battery is connected to the cathode (−) terminal the inverter (30) through the inverter plate (13). Eventually, the first battery (1) operates in a discharge mode. In this case, the diode (L3) for indicating the first relay operation is also energized. And the first relay displays to show an operation state (see the left LED in FIG. 11a).

Conversely, when a control signal of the second relay is outputted 'low' signal through the output terminal (S2), the transistor (Q3) for switching is turned off. Accordingly, the control signal (Vs2) of the second relay control signal output terminal (HD2) is 'HIGH'. A +12V voltage outputs to the solenoid of the second relay (12) (SW2 in FIG. 4) (124 in FIG. 6) through the upper power supply terminal of the second relay control signal output terminal (HD2). Thus, it is not energized through the low power supply terminal of the output terminal (HD2). Eventually, the second solenoid (124) is not in operation. So that the movable terminal (120) of the second relay is contacted to the first fixed terminal (121). The cathode (−) of the second battery is connected to the cathode (−) of the charger (40) through the charger plate. In this case, the second relay operating display diode (L5) is also no longer energized, so that the second relay does not operation state (refer the right side LED in FIG. 11a).

After this point, the voltage of the first battery is continuously decreased, that the first battery is in the charging state, the charging state of the second battery can be seen 80%, as shown in FIG. 11a.

Further processing, when the voltage of the first battery is decreased or the current has diminished below a predetermined value after elapsed the certain time, it is need to switch between the charging and discharging operations. Then, the control unit (20) reverses the relay control signal as seen in FIG. 11 b, the second relay is turned to the discharge mode, and the first relay is in the charging mode. On the other hand, a photograph of the FIG. 11 b shows the actual operation of the first battery voltage indicating 14.3V of the charging state voltage.

Subsequently, the basic control operation of the control IC will be described with reference to FIG. 10. First, the moment voltage of the first battery and the second battery is measured to output via each voltage display unit (260, 270) (S1, S2). Then, the measured moment voltages (VB1, VB2) of the first and second batteries are compared (S3). if the measured moment voltage of the first battery (VB1) is greater than the measured moment voltage of the second battery (VB2), the first relay is turned on for the first battery in discharging mode, and the second relay is turned off the second battery for charging mode (S4) (see FIG. 11a).

Then, the voltage of the first battery (1) in discharging mode is determined whether it is dropped below than the reference value (e.g. 0.2V) (S5). If it is not, the instant voltage of the first and second battery is measured for displaying. The moment voltage and charge progress state of the second battery in charging mode is measured and displayed, continuously and repeatedly of the steps (S4) to (S6)

On the other hand, as the result of the determination in step (S5), the voltage of the first battery (1) in discharging mode is dropped below reference value of the voltage (e.g. 0.2V), the first relay and the second relay is switched reversely to set the first battery in charging mode and the second battery in discharging mode (S7), and returns to the beginning for repeating the above process (S8)

Conversely, if the result of the determination in step (S3), the instant voltage (VB1) of the first battery is smaller than the instant voltage (VB2) of the second battery, the second relay is turned on for discharged mode of the second battery, and the first relay is turned off for charging mode of the first battery (S14) (see FIG. 11 b)

After determine whether the voltage drop of the second battery (2) in discharging mode is below the reference value (e.g. 0.2V) (S15). If not, the charging voltage and the charging state of the first and second batteries are continuously measured for displaying. Repeat the steps (S14) to (S16).

On the other hand, the voltage drop of the second battery (2) being in discharge state is below reference value (e.g. 0.2V) according to the result of the determination in step (S15), the first relay and second relay are reverse switching to the second battery in charging mode, the first battery in the discharging mode (S7). Then, returning to the beginning for repeating the above step (S8).

Further, above is an example case that the switching standard of the operation modes for the first and second batteries is set only by the voltage drop of the battery (0.2V) manipulating through the DIP switch (DIP1) of FIG. 9. In some cases, instead of the battery voltage, it is possible to perform the different setting of the switching operation standard by the battery current or switching time of charging and discharging through the DIP switch (DIP1) of FIG. 9.

As shown in FIG. 9, the option setting unit (290) comprises a control terminal of is the IC connected to the pull-up array resistor (RA2) and the DIP switch (DIP1), which is possible to set through the DIP switch (DIP1). As an example, the DIP switch No. 1 is switched on only, the mode switch is set to reverse the mode, when the voltage of the battery in the discharge mode is dropped 0.1V. Only the DIP switch No. 1 is on, the mode switch is set to reverse the charge mode when the voltage of the battery in the discharge mode is dropped 0.2V. If the DIP switches of No. 1 and No. 2 are on, the mode switch is set to reverse when the voltage of the battery in the discharge mode is dropped 0.3V. If the DIP switch of No. 3 is on only, the mode switch is set to reverse when the voltage of the battery in discharge mode is dropped 0.4V. If all three DIP switch No. 1 to No. 3 are on, the mode switch is set to reverse when the voltage of the battery in discharge mode is dropped 0.7V. Additionally, the DIP switch No. 4 is on, the mode switch is set to reverse when the current of the battery in discharge mode is dropped 100 A to 5 A. Or, the DIP switch No. 5 is on, the mode switch is set to reverse when the discharging time of the battery in discharge mode is elapsed 2.5 minutes. The DIP switch No. 6 is on, the mode switch is set to reverse when the discharging time of the battery in discharge mode is elapsed 5 minutes. The DIP switch No. 7 is on, the mode switch is set to reverse when the discharging time of the battery in discharge mode is elapsed 10 minutes. The DIP switch No. 8 is on, the mode switch is set to reverse when the discharging time of the battery in discharge mode is elapsed 20 minutes.

Further, it is possible to program the switching mode, which is determined the charge-reverse by combination of the voltage, current and elapsed time.

Finally, the voltage of the battery being discharged is below than 10.7V, it is necessary to stop all operation. If the battery is continuously discharged below than 10.5V, the battery may be impossible to rechargeable due to the overdischarging. In this case of the flowchart of FIG. 10, prior to the step (S4), a step is added to determine whether the voltage (VB1) of the first battery is less than 10.7V. If the voltage (VB1) of the first battery is greater than 10.7V, proceeds to step (S4). If the voltage (VB1) of the first battery is less than 10.7V, the program of the charging/discharging step is stopped. Also, prior to the step (S14), a decision step should be added whether the voltage (VB2) of the second battery is less than 10.7V. If the voltage of the second battery (VB2) is higher than 10.7V, precedes the step (S14). If the voltage of the second battery (VB2) is less than 10.7V, stop all programs of the charging and discharging.

Additionally, in each step (S5) and (S15), it will determined whether the voltage drop of each battery in the discharging mode is below the reference value (here 0.2V) or higher; whether the current drop of each battery in the discharging mode is below the reference value (e.g. 5 A) or higher; and whether the elapsing time of each battery in the discharging mode is below the reference value of discharging elapsed time (e.g. 5 minutes) or higher. It is possible to change the flow chart of the charging/discharging revere mode depending on the decisions what condition is met; one condition, two conditions or all three conditions.

On the other hand, the effect of the present invention will be described in more detail, below:

As known, the secondary battery is a reversible by utilizing the electrochemical reaction, as an example, a lead storage battery with an anode of the lead peroxide, the cathode of lead and dilute sulfuric acid is used as the electrolyte.

During the discharging of the secondary battery, the chemical reaction takes place between the electrode material and the electrolyte; on the cathode (−), the pure lead atom (Pb) reacts with the sulfuric acid ion (SO42) of the electrolyte, the sulfuric acid (H2SO4) is dissolved in water to be negatively charged sulfate ions and positively charged hydrogen ions (H+), and the lead atoms are combined to the sulfuric acid ion to be the sulfate lead (PbSO4) by losing two electrons.

The more using (discharging) the secondary battery, the more consume the sulfuric acid to generate the water. Then, the sulfuric acid will be more diluted. At this point, it is the time to charge the battery by using the charger.

The charger is forcibly reversed the electrons flow direction in the discharging process to occur the reversible reaction. When the reversible reaction of the discharging process occurs, the electrolyte changes back to the original material. The amount of sulfuric acid in the secondary battery being charged will be increased enough to supply the power again.

That is, as the discharging progress, both cathode (−) and anode (+) are changed to the lead sulfate; the reacting speed rate is reduced; and the water produced as a by-product is diluted the electrolytic; but, the solution could be concentrated by a reversible chemical reaction of the charging process.

The present invention is used more than two secondary batteries for prolong the discharging time (battery life). The efficiency of secondary battery is gradually reduced because the anode (+) and cathode (−) are reacted to change the lead sulfate, during the repetition of the charging/discharging process. The discharging time (battery life) as using the fully charged secondary battery could be increased by reducing the reaction rate.

For example, in case of both batteries are 12.7V; the first battery supplies the power to the load until it reaches to be 12.5V. Then the mode is switched, as the second battery is for discharging mode and the first battery sets in charging mode. As an example, at a point of the second battery voltage is 12.5V; the first battery is recharged to be 12.6V. When both voltages of the second batteries are dropped less than 10.7V, the batteries are stopped to discharge. However, it is possible to prolong the discharging time for operating the load.

On the other hand, in case of the voltage 12V of the lead battery, when it is fully charged, the battery voltage is observed approximately 14.5-13.5V; as progress the discharging, the voltage is continuously lowered to be 12V, without noticeable change; if the voltage is dropped below 12V, the capacity of the battery is drastically decreased (The performance of battery slightly different depending on the property of each battery. However, it is common that all batteries are sharply decreased the performance at a certain point instead of decreasing proportionally, known as creep phenomenon). This is due to discharging, the electrodes are gathered the sulfate material between cells to significantly degrade the performance of the battery. The present invention frequently performs the reversible reactions of the charging/discharging, alternately to minimize the sticking of the lead sulfate material on the electrode. In other words, under the same conditions and same time, the frequent reversible reaction delays to be gathered the sulfate on the electrodes. It is presumably similar phenomenon that the moss cannot grow in the flowing water.

<Table 2> is the experimental result showing the actual voltage variation and the discharging time of the battery, which has used the same battery, same conditions and the same charging process of <Table 1> of the present invention for discharging:

As shown below the <Table 2>, once the lead battery is fully charged, it can be used about 3 hours 14 minutes. While the battery is discharging, the output voltage and the inverter output voltage is gradually reduced. Finally, during the repeating process of the charging and discharging, the alteration rate of the anode (+) and cathode (−) is reduced. Thus, the efficiency of the battery is gradually reduced, the original battery capacity having (ideally 2.4 kWh) is consumed (0.95 kWh) more than for the continuous discharging (0.49 kWh).

TABLE 2

| Time | Input Voltage (V) | Battery Charge Current (A) | Charger Using Current (A) | Inverter Using Current (A) | Inverter Output Voltage (V) | Load Current (A) | Total Current (A) | Used Power (W) |
| --- | --- | --- | --- | --- | --- | --- | --- | --- |
| 0 | 12.5 | 4.7 | 8.9 | 2.9 | 218 | 28.4 | 36.0 | |
| 30 | 12.3 | 5.9 | 9.9 | 2.9 | 218 | 28.4 | 37.2 | |
| 60 | 12.0 | 7.3 | 10.4 | 2.9 | 217 | 28.4 | 37.8 | |
| 90 | 11.7 | 7.7 | 11.4 | 3.0 | 217 | 28.4 | 38.1 | |
| 120 | 11.3 | 8.3 | 11.3 | 3.2 | 216 | 28.4 | 38.9 | |
| 150 | 11.0 | 9.8 | 11.5 | 3.2 | 214 | 28.4 | 39.4 | |
| 180 | 10.8 | 10.3 | 12.1 | 3.3 | 208 | 28.4 | 40.0 | |
| 194 | 10.5 | 10.8 | 12.7 | 3.3 | 203 | 28.4 | 41.5 | 0.95 |

Particularly, it is impossible to discharge the battery below than 10.7V, in general. Nevertheless, the present invention is observed that it is possible to discharge the battery below even to 9.5V, because the electrode is minimized to gather the sulfate material. However, it is preferable to stop the discharging below 10.7 V, in order to easily recharge the battery as described before.

Further, it is possible to greatly increase the recharging and discharging cycles of the battery according to the present invention, by reducing the phenomenon of sticking the sulfate on the electrode as described above. The present invention has a merit that the number of cycles is remarkably increased more than that of the battery manufacturing company, which is limited 300 cycles. It has an additional advantage that the entire service of the battery life is increased 2-3 times longer. In other words, the first charge cycle has the battery efficiency of 37.7%, which is higher than the common case of the continuously charged efficiency (16.6%). Of course, the third charge cycle has the battery efficiency of 43.7%, which is higher than the common case of the continuously charged efficiency (15%). The fifth charge cycle has the battery efficiency of 56.2%, which is higher than the common case of the continuously charged efficiency (13.9%).

Furthermore, it will take more than 10 hours to charge the Delco battery after completely discharged. According to the present invention, it is possible to charge the second battery by an external power source, such as a solar cell without any risk of explosion or overheating, during the discharging of the first battery. In such a case of using the auxiliary external power, it has an additional advantage to discharge the battery power for unlimited time.

Additionally, the effect of the present invention is used the battery, especially for lead battery as an example, it is not necessarily to limit the lead battery. The lithium secondary battery as well as other secondary battery is found the significant effect. The number of the battery also, is not limited two batteries. It is also possible to combine the three or more batteries to apply for the present invention.

So far, the embodiments of the present invention are described. And, it must not be interpreted that the technical spirit of the present invention should not be limited. The protecting scope of the present invention is limited only in the detail description of the claims. Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A power supply device, which employs more than two secondary batteries, the power supply device is comprised of:
    more than two secondary batteries capable of charging an 1 discharging;
    an inverter for delivering a partial DC output voltage of the secondary battery in discharging mode to a load, when one of the more than two secondary batteries is discharged;
    a battery charger for charging other secondary battery different from the secondary battery in discharging mode of the more than two secondary batteries, the partial output of the inverter being electrically connected to the battery charger, and the partial output of the inverter is input to the battery charger for charging the other secondary battery in charging mode, when the other of the more than two secondary batteries is charged;
    a relay unit having two relays, each relay performing the switching operation for connecting the inverter to a secondary battery in discharging mode at a time point, and for connecting, at the other time point, the inverter to other secondary battery which was in charging mode; and
    a controlling unit for alternately supplying the power of the more than two secondary batteries to the load by controlling the switching operation of each relay of the relay unit through the inverter,
    wherein he anodes (+) terminals of the more than two secondary batteries are fixedly inter-connected;
    wherein the control unit switches the cathode (−) terminals of the more than two secondary batteries;
    wherein, the battery charger is able to admit an external AC power including a commercial AC power, in case of charging the secondary battery in charging mode, and to charge the secondary battery in charging mode by the external AC power source during the other secondary battery in discharging mode is delivering the load the power by inverting the DC output voltage;
    wherein the relay unit includes that: a first battery connection plate (15) being connected to a cathode (−) terminal of a first secondary battery; a second battery connection plate (16) being connected to a cathode (−) terminal of the second secondary battery; a first relay (11), whose movable terminal is connected to the first battery connection plate (15); a second relay (12), whose movable terminal is connected to the second battery connection plate (16); a charger connecting plate (13), which is commonly connected to each first fixed terminal (111, 121) of the first and second relays; and an inverter connecting plate (14), which is commonly connected to each second fixed terminal (112, 122) of the first and second relays;
    wherein, the controlling unit controls the relay unit in order that: the movable terminal of the first relay (11) is connected to the first fixed terminal (111), at the same time that the movable terminal of the second relay (12) is connected to the second fixed terminal (122); whereas the movable terminal of the first relay (11) is connected to the second fixed terminal (112), at the same time that the movable terminal of the second relay (12) is connected to the first fixed terminal (121); and therefore the cathode (−) terminals of the more than two secondary batteries are switched by the controlling unit to alternately convert between the discharging mode and the charging mode of the more than two secondary batteries;
    wherein the controlling unit further includes a battery power input unit (210) for inputting the power of the secondary batteries when controlling the switching operation of each relay in the relay unit; and
    wherein each relay is provided on each plate (11b, 12b) over a base (10a), non-conductive supports (11c, 12c) are fixed in front of each plate, the charger connection plate (13) and the inverter connection plate (14) are across fixed to the non-conductive supports, the charger connection plate (13) and the inverter connection plate (14) are electrically separated, the charger connection plate (13) is electrically connected to the first fixed terminals (111, 121) of the first relay and the second relay (11, 12), and the inverter connection plate (14) is electrically connected to the second fixed terminals (112, 122) of the first relay and the second relay (11, 12).

2. The power supply ply device according to claim 1, further comprising that:
    a first secondary battery (1) and a second secondary battery (2) form a pair for more than two secondary batteries.

3. The power supply device according to claim 1, the controlling unit is further comprising that:
    a battery voltage display unit (260, 270) for outputting a voltage of the secondary battery inputted from the battery power input unit (210);
    a relay control signal output unit (250) for outputting a relay control signal to control the relay operation; and
    a processing unit (240) including a control 1C for outputting a relay control signal via the relay control signal output unit (250) after detecting the voltage magnitude of the secondary battery.

* * * * *